United States Patent [19]
Hubert

[11] Patent Number: 6,113,035
[45] Date of Patent: Sep. 5, 2000

[54] ATTITUDE CONTROL BY MODULATING THE RATE OF PROPELLANT DEPLETION

[75] Inventor: Carl Henry Hubert, Cranbury, N.J.

[73] Assignee: Lockheed Martin Corp., Sunnyvale, Calif.

[21] Appl. No.: 08/216,382

[22] Filed: Mar. 23, 1994

[51] Int. Cl.[7] ................................................. B64G 1/26
[52] U.S. Cl. ................................................. 244/169; 701/13
[58] Field of Search .................................. 244/169, 172, 244/164, 135 R, 135 C, 158 R; 701/13

[56] References Cited

U.S. PATENT DOCUMENTS

| | | | |
|---|---|---|---|
| 4,470,568 | 9/1984 | Nuefeld | 244/164 |
| 5,058,834 | 10/1991 | Hubert | 244/164 |
| 5,148,674 | 9/1992 | Morris | 60/240 |
| 5,251,852 | 10/1993 | Pulkowski et al. | 244/135 C |
| 5,284,309 | 2/1994 | Salvatore et al. | 244/164 |

*Primary Examiner*—Galen L. Barefoot
*Attorney, Agent, or Firm*—W. H. Meise; R. P. Kennedy

[57] ABSTRACT

A spacecraft according to the invention includes a pair of propellant tanks, with the nominal center of mass of the spacecraft located therebetween. Propellant is coupled from the tanks to a velocity-change-inducing thruster by a controllable coupling arrangement. Unwanted torques may occur which tend to perturb the attitude. An attitude control arrangement generates an error signal in response to deviations of the attitude from the desired attitude. The error signal is processed to control the propellant coupling arrangement, to cause propellant to be used preferentially from at least one of the tanks in a manner which tends to move the actual center of mass relative to the axis of thrust or line of action of the thruster. In one embodiment of the invention, the controllable coupling arrangement includes a manifold for coupling propellant from the tanks to the thruster, a tank of pressurizing gas, and a controllable manifold coupling the tank of pressurizing gas to the propellant tanks. The attitude error signal is processed to control the pressurant gas pressure in the propellant tanks, to thereby tend to feed preferentially from one tank to the thruster, to thereby move the center of mass toward (or sometimes away from) the axis of thrust of the thruster.

9 Claims, 3 Drawing Sheets

6,113,035

ATTITUDE CONTROL BY MODULATING THE RATE OF PROPELLANT DEPLETION

FIELD OF THE INVENTION

This invention relates to spacecraft attitude control during velocity change maneuvers, stationkeeping, or other orbital maneuvers, and more particularly to adjusting the rate of depletion of propellant from propellant tanks to maintain attitude during velocity change.

BACKGROUND OF THE INVENTION

It is well known that the load of consumables such as propellant must be maximized when spacecraft are launched. Similarly, the amount of consumables used for each maneuver should be minimized, to achieve the greatest possible on-orbit or on-station lifetime.

Reaction wheel and magnetic interaction schemes have been used to aid in attitude control when the spacecraft is on-station to reduce the need to use thrusters, to aid in extending the life of a spacecraft by reducing the consumption of consumables. Also, when on-station, the spacecraft may from time to time require operation or burn of one or more thrusters for orbital maneuvers, such as imparting a velocity change, as occurs, for example, for pre-operational orbit circularization, or for maintenance of north-south station (stationkeeping). Disturbance torques are generated during thruster burn due to offsets between the actual center of mass of the spacecraft and the thrust axis of the thruster. These offsets may be due to unavoidable errors in determining the center of mass and in aligning the thrust axis. Also, when the propellant flow rate is high, as when a thruster is used to leave a transfer orbit, the actual center of mass may move during thruster burn due to uneven draw of propellant from the tanks. Other causes of torques include engine exhaust plume impingement on various spacecraft surfaces. In order to maintain the spacecraft attitude during an orbital maneuver, it may be necessary to burn or operate attitude control thrusters, to counter unwanted torques which accompany the firing of a velocity-change-inducing thruster. Thus, more propellant may be used when a velocity change is commanded than is required for the velocity change itself, with the additional propellant being used by attitude control thrusters to maintain attitude during the maneuver. An improved attitude control method is desired.

SUMMARY OF THE INVENTION

A spacecraft according to the invention includes at least one pair of propellant tanks, with the nominal center of mass located therebetween. Propellant is coupled from the tanks to a velocity-change-inducing thruster by a controllable coupling arrangement. An attitude control arrangement generates an error signal in response to deviations of the attitude from the desired attitude. The error signal is processed to control the propellant coupling arrangement, to cause propellant to be used preferentially from the tanks in a manner which tends to correct unwanted torques, by, for example, moving the actual center of mass relative to the axis of thrust or line of action of the thruster. When the torque is due to misalignment of the thrust axis relative to the actual center of mass, some propellant is moved from a tank on the "heavy" side of the spacecraft to a tank on the other side of the thrust axis, to thereby tend to move the actual center of mass toward the thrust axis. In one embodiment of the invention, the controllable coupling arrangement includes a manifold for coupling propellant from the tanks to the thruster, a tank of pressurizing gas, and a controllable manifold coupling the tank of pressurizing gas to the propellant tanks. The attitude error signal is processed to control the pressurant gas pressure in the propellant tanks, to thereby tend to feed preferentially from one tank to the thruster, to thereby move the center of mass toward the axis of thrust of the thruster.

DESCRIPTION OF THE INVENTION

Figure 1:
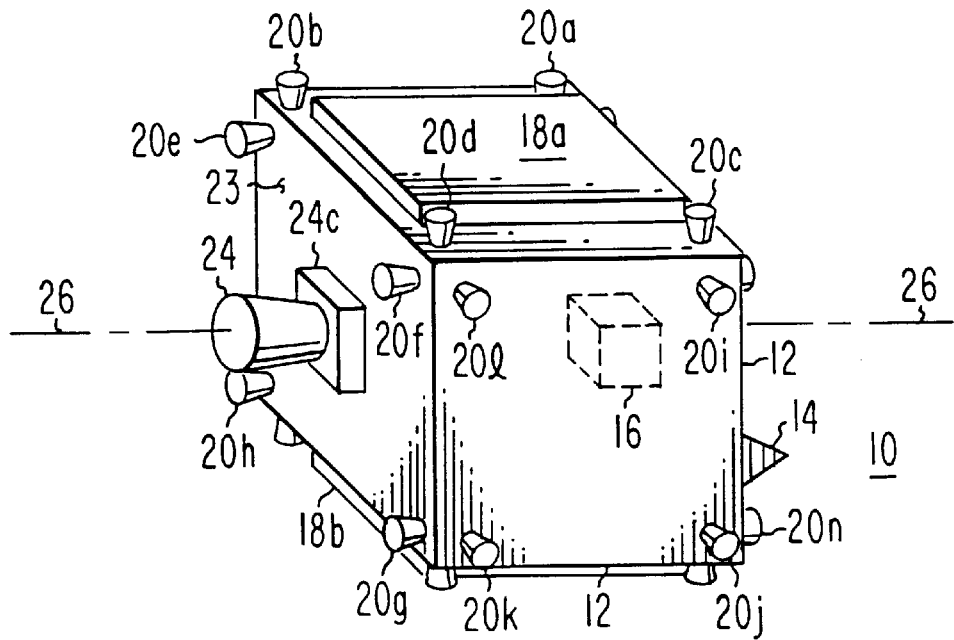
FIG. 1 is a simplified perspective or isometric view of a spacecraft including a body, attitude control thrusters and an apogee engine.

In FIG. 1, a spacecraft designated generally as 10 includes a body 12 and a plurality of attitude control thrusters 20, namely 20a, 20b, 20c, 20d, 20e, . . . 20n. An antenna 14 provides communications between the spacecraft and a ground station or other location. A gyroscope illustrated as a block 16 is affixed to body 12, for generating signed attitude error signals (attitude signals with a + or − sign, depending upon the direction of the attitude error). The illustrated state of spacecraft 10 is a state in which the solar panels, 18a and 18b, are not yet deployed, which condition may occur, for example, when the spacecraft is in a transfer or intermediate orbit. An orbit-changing or apogee thruster 24 is mounted on a face 23 of spacecraft body 12, and includes a combustion chamber designated 24c. The thrust axis of thruster 24 is illustrated as 26. Thruster 24 is operated or fired to generate the velocity change necessary for the transition from one orbit to another, as for example from a transfer orbit to a geosynchronous orbit. During such a transition, thruster 24 typically may be fired two or three times, for twenty to eighty minutes each time, depending upon the thruster thrust, the mass of the spacecraft, and the velocity change to be induced. The thruster burn intervals may be controlled from a ground station by communications passing through antenna 14, or the control may be autonomous.

Figure 2:
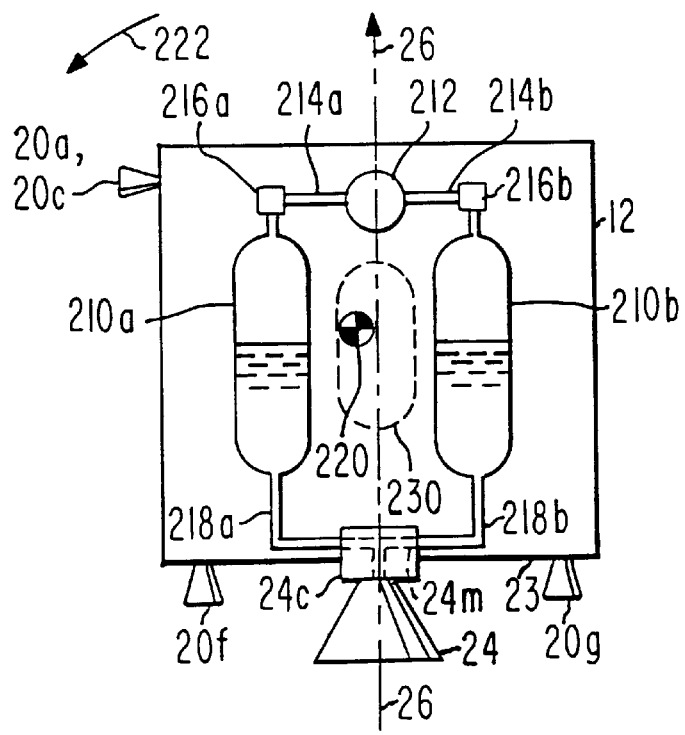
FIG. 2 is a simplified representation of the locations of the propellant tanks of the spacecraft of FIG. 1, the thrust axis of the apogee engine and one possible relationship of the center of mass to the thrust axis.

FIG. 2 is a simplified block diagram of the fuel or propellant distribution arrangement of the spacecraft of FIG. 1. In FIG. 2, a pair of propellant tanks 210a, 210b are mounted on body 12 on either side of thrust axis 26. A tank 212 of pressurizing gas is connected by check valves, pyrotechnic valves, filters and the like (not illustrated) by way of paths 214a and 214b to controllable pressure regulators 216a and 216b, respectively, The pressurizing gas is applied from regulators 216a and 216b to propellant tanks 210a and 210b, respectively. When pressurized, the propellant in tanks 210a and 210b is urged by way of pipes or paths 218a and 218b, respectively, toward combustion chamber 24c of thruster 24. Pipes 218a and 218b may also include check valves, pyrotechnic valves, or other devices (not illustrated). Pipes 218a and 218b may be considered to be connected together by a manifold 24m which communicates with combustion chamber 24c. If thruster 24 requires bipropellant, the oxidizer component of the propellant may be stored in a tank illustrated as 230, located between tanks 210a and 210b. Those skilled in the art know how to couple the oxidizer to the thruster.

In operation of the arrangement of FIG. 2, pressure regulators 216a and 216b pressurize the tanks to a selected level, and thruster 24 is fired. When the thruster is fired, propellant is allowed to flow by way of manifold 24m to combustion chamber 24c, and the propellant pressure at the combustion chamber tends to drop as propellant is consumed. Since the pressure at manifold 24m has only one value, the rate of propellant flow from each propellant tank 210a and 210b depends upon the pressure of the pressurant gas in the tank. Pressure regulators 216a and 216b admit pressurizing gas to propellant tank 210a and 210b, respectively, to maintain the propellant pressure at the combustion chamber within predetermined design limits as propellant is consumed. Ordinarily, a substantial amount of propellant will remain after the geosynchronous orbit is achieved, and is available to attitude control thrusters 20a–20n for attitude control, and is also available for North-South stationkeeping maneuvers.

The actual center of mass (CM) is illustrated in FIG. 2 by a conventional symbol designated 220. As illustrated, CM 220 does not lie on thrust axis 26. Actual CM 220 may deviate from thrust axis 26, with the most likely reasons for the deviation being due to inherent CM offset, or due to unavoidable misalignment of the mounting of thruster 24 on spacecraft body 12, but such an offset may also be due to errors in the determination of masses or locations of the various components or portions of the spacecraft, due to damage to the spacecraft, or due to shifting or differential consumption of the propellant masses in the tanks. Operation of thruster 24 with CM 220 offset as illustrated in FIG. 2 results in acceleration in the direction of thrust axis 26, and also undesirably results in a torque or moment, illustrated by an arrow 222, about center of mass 220. The undesired torque will result in a change of attitude during the firing of the thruster, and the magnitude of the attitude error will increase with increasing time. This attitude error could be corrected by firing one or more of attitude control thrusters 20, as for example thrusters 20a and 20c, which could be pulse-modulated in conventional manner to achieve the desired net torque to correct the attitude. However, operation of thrusters 20a and 20c does not contribute velocity in the desired direction. Even if thrusters on face 23 were to be operated to correct the attitude, the contribution of velocity per unit mass of propellant may not be large, as the attitude control thrusters may not have as great a specific thrust as apogee thruster 24. Consequently, it is desirable to have thrust axis 26 pass through center of mass 220. This condition could be guaranteed by a vectored or gimballed thruster, but the gimbals and associated controls might be so heavy as to obviate any advantage arising from their use.

In some cases, an unwanted torque may occur when the apogee engine is operated, even if the actual center of mass lies on the thrust axis. Such a condition might occur, for example, in the case of thruster plume impingement on a portion of the spacecraft body. The unwanted torques attributable to such causes may be corrected in the same manner as those due to CM offsets from the thrust axis.

According to an aspect of the invention, pressure regulators 216a and 216b of FIG. 2 are controlled, during firing of thruster 24, to pressurize tanks 210a and 210b to different pressures, so that, when propellant is allowed to flow to combustion chamber 24c during firing, propellant is drawn preferentially from one of the propellant tanks, such as the propellant tank closer to the center of mass, to thereby tend to shift the center of mass toward the thrust axis in the case of CM offset, or in a direction to compensate for the unwanted torque in other cases. Referring to FIG. 2, tank 210a would be pressurized to a higher pressure than tank 210b, so that propellant would be preferentially drawn from propellant tank 210a during firing of thruster 24, thereby shifting center of mass 220 to the right, toward thrust axis 26.

Figure 3:
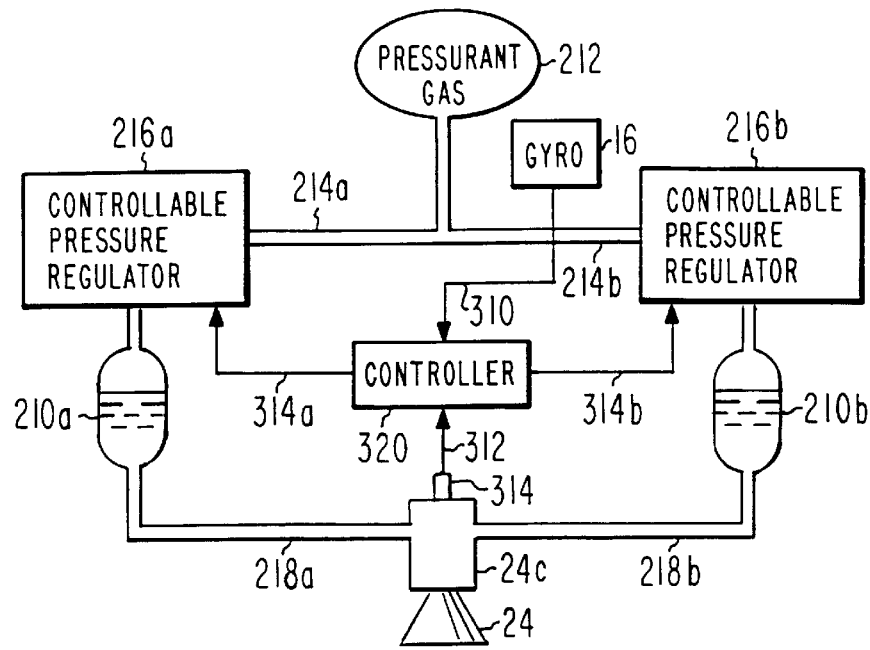
FIG. 3 is a simplified block diagram of the propellant pressurization system of the spacecraft of FIG. 2, controlled in accordance with an aspect of the invention.

In FIG. 3, attitude signals or attitude rate signals from the attitude sensor, which in the example is gyroscope 16, are coupled by a path 310 to a controller 320. Combustion chamber injection pressure information is coupled by an injection pressure sensor 314, over a path 312, to controller 320. Controller 320 processes the attitude information and the pressure information, and generates pressurant or pressure regulator control signals, which are applied over paths 214a and 214b to pressure regulators 216a and 216b, respectively. In general, controller 320 sets the two pressure regulators to pressures near the desired combustion chamber injection pressure, with a pressure difference between the tanks which ultimately results in preferential drawing of propellant from one of the tanks, generally the tank on the "heavier" side, which corrects the position of the center of mass toward thrust axis 26, or which at least tends to correct the undesired torque.

Figure 4:
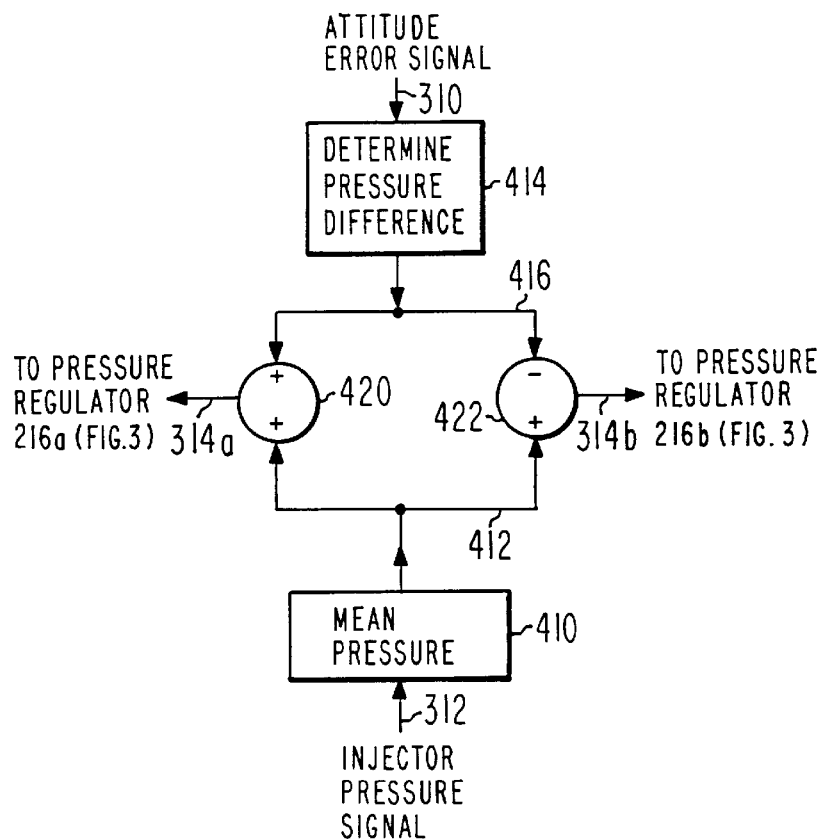
FIG. 4 is a simplified block diagram of a controller which may be used in the arrangement of FIG. 3.

FIG. 4 illustrates details of controller 320 of FIG. 3. In FIG. 4, the injector pressure signals from injector pressure sensor 314 of FIG. 3 are applied over path 312 to an integrator or averaging arrangement illustrated as a block 410. Averaging block 410 generates a signal representing the mean of the injector pressure signal, and applies it over a path 412 to the noninverting input ports of a pair of summing circuits 420, 422. Signed attitude error signals from gyroscope 16 of FIG. 3 are applied to a processor 414, which establishes the sign and magnitude of the pressure differential which is required, and generates a signed signal on a path 416 representing one-half that magnitude. Processor block 410 may simply be a ROM, preprogrammed at its addressable storage locations with various values of half-differential-pressure signals appropriate to the attitude error. The half-pressure-differential signal is applied by one branch of signal path 416 to a second noninverting input port of summing circuit 420, and by a second branch of signal path 416 to the inverting input port of summing circuit 422. Summing circuit 420 adds the half-differential-pressure signal at its second noninverting input port to the mean pressure signal at its first noninverting input port, to thereby generate on signal path 314a a signal representing the mean injector pressure signal, plus the half-differential-pressure signal. Summing circuit 422 subtracts the half-differential-pressure signal at its inverting input port from the mean pressure signal on its noninverting input port, to produce on signal path 314b a signal representing the mean pressure minus the half-differential-pressure. The difference between the signals on paths 314a and 314b represents the desired pressure difference between the propellant tanks. The signals on paths 314a and 314b are applied to pressure regulators 216a and 216b, respectively, for controlling the pressures to which the regulators regulate.

Figure 5:
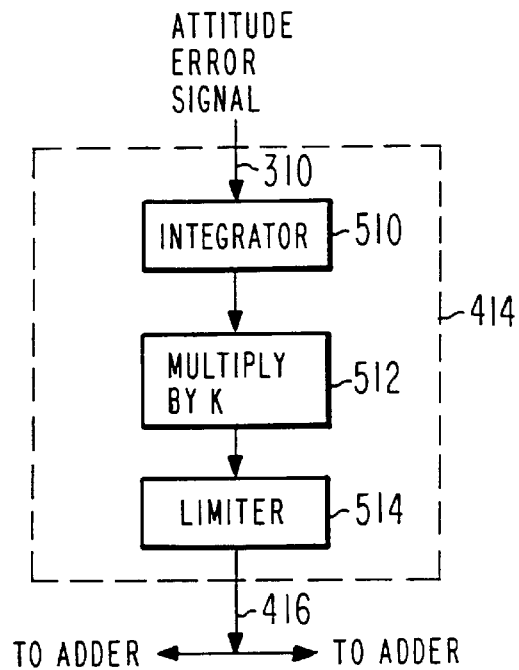
FIG. 5 is a simplified block diagram of a pressure difference signal generator portion of the controller of FIG. 4.

FIG. 5 represents the processing which may be performed in an alternative embodiment of pressure difference determination block 414 of FIG. 4. In FIG. 5, the attitude error signal is applied to a block 510 from signal path 310. Block 510 is an integrator, which, if necessary, converts attitude rate signal to attitude. The attitude signal is applied to a block 512, which represents the multiplication of the attitude by a constant K to scale the signal to a range which is symmetrical about a reference value, such as zero. The scaled signal is applied from block 512 to a block 514, which represents a limitation of the value of the half-differential signal. The limit prevents excessive pressure differences between the propellant tanks, to keep the tank pressures within a predefined range, or more specifically, to maintain the nominal-plus-half-differential pressure below a maximum value to avoid danger of explosion, and to maintain the nominal-minus-half-differential pressure above a minimum value, to maintain the minimum propellant flow rate prescribed by the propulsion system. An electrically augmented thruster system (EHTs and arcjets) may require a minimum propellant flow rate to prevent overheating, and nonaugmented engines (REAs) may experience reduced efficiency at low propellant flow rates.

In operation of the arrangement of FIGS. 2, 3, 4, and 5, the control loop of FIGS. 3, 4, and 5 is enabled at the beginning of a burn of thruster 24. As the thruster fires, a signed attitude error will be generated due to the lack of coincidence between CM 220 and thrust axis 26, or more generally due to unwanted torques. This attitude error will tend to increase with time. The attitude error is processed by pressure difference determiner 414, to produce a pressure difference signal which tends to increase in magnitude as the attitude error increases, and which has a sign which depends upon the direction of the attitude error. The pressure difference signal, in turn, is added and subtracted from the mean pressure signal, to thereby control the pressure regulators to increase the pressure of the pressurant gas in one of the propellant tanks relative to the other. In the case of an actual deviation of the center of mass from the thrust axis, the pressure is increased in that one of propellant tanks 210a and 210b which is nearest the actual center of mass, relative to the pressure in the other propellant tank. As a result of the pressure difference between the tanks, propellant is preferentially drawn from the tank having the higher pressure, which shifts the actual center of mass, thereby tending to reduce the attitude error without firing additional thrusters for attitude control. When the torque and resulting attitude error arises from a CM displaced from the thrust axis, the center of mass is shifted toward the thrust axis.

When the burn is completed, a pressure difference exists between the tanks. If a simple manifold connects pipes or paths 218a and 218b of FIGS. 2 and 3, propellant will flow between propellant tanks 210a and 210b to equalize the pressure. This flow occurs when the thruster is not firing. If the flow of propellant between tanks after firing of the thruster is inconvenient, a valve or valves associated with path 218a, 218b may be closed to prevent the pressure equalization. The flow of propellant after the burn, if permitted, generally will not result in a significant attitude error, but such an attitude error, should it occur, may be corrected, if desired, by means of magnetic torquers or reaction/momentum wheels, so as not to expend propellant.

Figure 6:
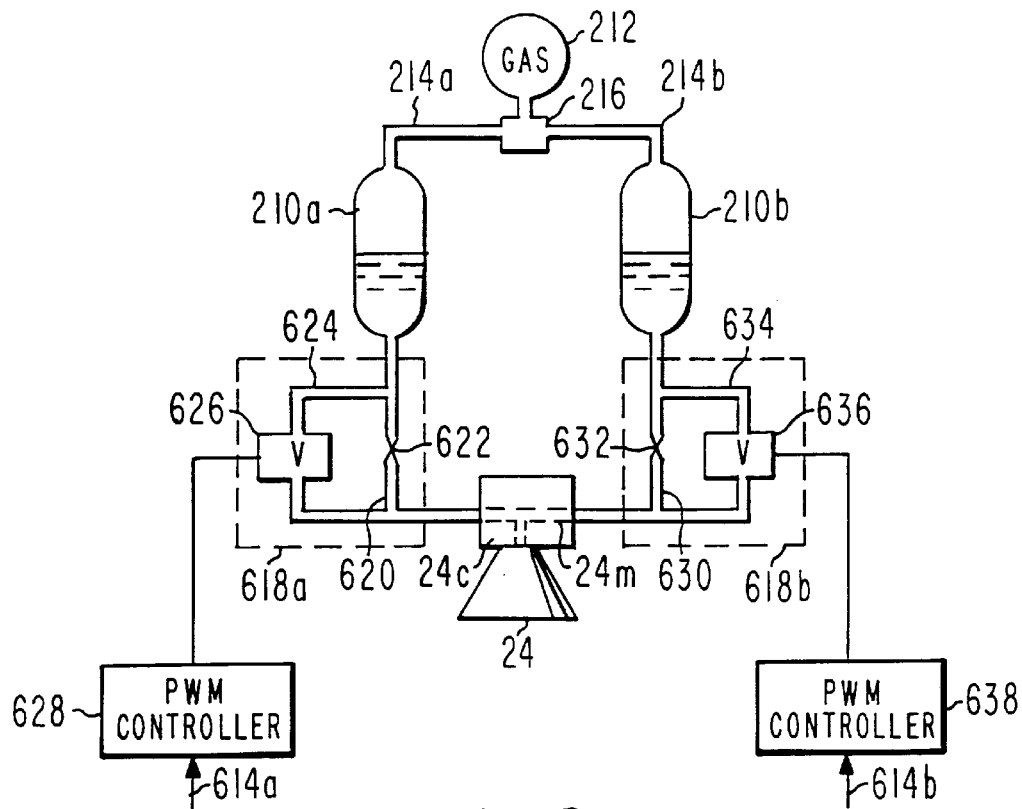
FIG. 6 is a simplified block diagram of another embodiment of the invention, in which the differential flow rate is established by flow restriction devices rather than by differential pressurization.

FIG. 6 illustrates an alternative embodiment of the invention, in which the pressurant is applied equally to both propellant tanks, and a controllable flow restrictor is coupled between the outlet of each propellant tank and the manifold associated with combustion chamber 24c of thruster 24. In FIG. 6, a single fixed pressure regulator 216 is coupled to the output of pressurant gas tank 212, and pressurant gas at equal pressures is applied over paths 214a and 214b to propellant tanks 210a or 210b. All else being equal, the equal pressures of pressurant in tanks 210a and 210b would result in drawing of equal amounts of propellant from the two tanks during burn of thruster 24. In order to accomplish the ends of the invention, the arrangement of FIG. 5 couples propellant from propellant tanks 210a and 210b to the manifold associated with combustion chamber 24c of thruster 24 by way of controllable propellant coupling paths 618a and 618b, respectively. Propellant coupling path 618a includes a first pipe or path 620, which includes a flow restrictor 622, paralleled by a second pipe or path 624 in series with a valve (V) 626. Similarly, propellant coupling path 618b includes a first pipe or path 630, which includes a flow restrictor 632, paralleled by a second pipe or path 634 in series with a valve 636. Valves 626 and 636 are each associated with a pulse-width controller 628 and 638, respectively. Pulse-width controllers 628 and 638 are coupled by paths 614a and 614b, respectively, to receive signals corresponding to those generated on paths 314a and 314b of FIG. 4, for controlling the flow rate through coupling paths 618a and 618b of FIG. 6 to achieve the desired mean pressure at the manifold associated with combustion chamber 24c together with a differential propellant flow rate.

Other embodiments of the invention will be apparent to those skilled in the art. For example, the invention is described as being used in the context of a transition from a transfer orbit to a geosynchronous orbit, but it may be used for any thruster firing in which a velocity change is desired. While a gyroscope has been described as the attitude sensor, the type of attitude sensor will depend on the type of orbit and on the available attitude or attitude rate instrumentation. The invention may also be applied to multiple pairs of propellant tanks, by separately controlling each pair of tanks as described above, in response to different attitude control signals. Such multiple tanks are preferably symmetrically disposed relative to the nominal center of mass.

What is claimed is:

1. A spacecraft, comprising:

a three-axis stabilized body;

first and second spaced-apart propellant tanks, with the nominal center of mass of said body and propellant tanks therebetween;

a first thruster coupled to said body, and having its axis of thrust passing through said nominal center of mass;

a load of propellant in said propellant tanks, with a distribution which may, in conjunction with other portions of said body of said spacecraft, cause the location of the actual center of mass to deviate from said nominal center of mass;

propellant coupling means coupled to said propellant tanks and to said first thruster, for supplying propellant to said first thruster from said propellant tanks during operation of said thruster, whereby said operation may result in torques which perturb the attitude of said spacecraft, which, if an attitude control thruster is provided, may require energization of said attitude control thruster for maintaining said attitude;

attitude sensing means coupled to said body for sensing deviation of said attitude from a desired attitude for generating signals indicative of said deviation; and control means coupled to said attitude sensing means and to said propellant coupling means, for controlling said propellant coupling means in response to said error signals, only during operation of said first thruster, in a manner which preferentially feeds propellant from one of said first and second tanks to said first thruster in a manner which tends to move said actual center of mass relative to said axis of thrust in a manner which tends to maintain said attitude.

2. A spacecraft according to claim 1, wherein said propellant coupling means comprises:
   a manifold coupled to said first and second propellant tanks for providing a path for the flow of said propellant from said first and second propellant tanks to said first thruster;
   a source of pressurizing gas; and
   controllable coupling means coupled to said source of pressurizing gas and to said first and second propellant tanks for controlling the flow of said pressurizing gas to said first and second propellant tanks in a manner which applies greater pressure of said pressurizing gas to that one of said first and second propellant tanks which preferentially feeds propellant.

3. A spacecraft according to claim 2, wherein said controllable coupling means comprises first and second controllable pressure regulation means coupled to said first and second propellant tanks, respectively, and to said control means, for being controlled by said control means so that said one of said propellant tanks which preferentially feeds propellant is associated with that one of said first and second controllable pressure regulation means which is set to the higher regulated pressure.

4. A spacecraft according to claim 3, wherein said control means comprises:
   first and second summing means, said first summing means including an output port and first and second noninverting input ports, said second summing means including an output port and first noninverting and second inverting input ports, for generating first and second summed signals at said output ports of said first and second summing means, respectively, in response to signals applied to said input ports, and for coupling said first and second summed signals to said first and second controllable pressure regulation means, respectively;
   thruster average injector pressure determining means coupled to said first thruster and to said first and second summing means, for generating thruster average injector pressure signals, and for applying said thruster average injector pressure signals to said first input ports of said first and second summing means;
   pressure difference establishing means coupled to said attitude sensing means and to said first and second summing means, for receiving said error signals, for generating pressure difference signals therefrom, and for applying said pressure difference signals to said second input ports of said first and second summing means such that said first and second summed signals, when said first and second summed signals are applied to said first and second pressure regulating means, controls said pressures in a manner which adjusts the flow rates of propellant from said propellant tanks in a polarity which tends to move said actual center of mass relative to said axis of thrust.

5. A spacecraft according to claim 4, wherein said pressure difference establishing means comprises:
   integrating means coupled to said attitude sensing means for integrating said error signal to generate an integrated error signal;
   multiplication means coupled to said integrating means, for multiplying said error signal by a constant to generate said pressure difference signals.

6. A spacecraft according to claim 5, further comprising limiting means coupled to said multiplication means for limiting the maximum value of said pressure difference signals.

7. A spacecraft according to claim 1, wherein said propellant coupling means comprises a manifold coupled to said propellant tanks and to said thruster, said manifold including a branch coupled to one of said propellant tanks, which branch includes a flow restriction device, and controllable bypass means coupled around said flow restriction device, for thereby allowing control of the flow rate from said one of said propellant tanks by energizing and not energizing said bypass means.

8. A method for imparting a velocity to a spacecraft, which spacecraft defines an actual center of mass lying between first and second propellant tanks, and which includes a thruster coupled to the propellant tanks for receiving propellant therefrom, and with a thrust axis which does not pass through said actual center of mass of said spacecraft, said method comprising the steps of:
   firing said thruster, to thereby draw propellant from said first and second propellant tanks;
   only during the firing of said thruster, controlling the flow of said propellant from said tanks in a manner which tends to move said center of mass relative to said thrust axis.

9. A method according to claim 8, wherein said step of controlling the flow of said propellant from said first and second tanks includes the step of preferentially drawing said propellant from that one of said first and second propellant tanks which is closer to said center of mass.

* * * * *